(12) United States Patent  
Edgar et al.

(10) Patent No.: US 11,475,727 B2  
(45) Date of Patent: Oct. 18, 2022

(54) METHOD AND SYSTEM FOR DETERMINING IF PAPER CURRENCY HAS NUMISMATIC VALUE

(71) Applicants: R B Edgar, Taylorsville, UT (US); Alan Adair Moss, Cottonwood Heights, UT (US)

(72) Inventors: R B Edgar, Taylorsville, UT (US); Alan Adair Moss, Cottonwood Heights, UT (US)

(73) Assignee: R B Edgar et al., Taylorsville, UT (US)

( * ) Notice: Subject to any disclaimer, the term of this patent is extended or adjusted under 35 U.S.C. 154(b) by 0 days.

(21) Appl. No.: 16/450,963

(22) Filed: Jun. 24, 2019

(65) Prior Publication Data

US 2021/0312745 A1    Oct. 7, 2021

(51) Int. Cl.
| | |
|---|---|
| G06K 9/00 | (2022.01) |
| G07D 7/202 | (2016.01) |
| G07D 11/50 | (2019.01) |
| G06T 7/00 | (2017.01) |
| G06N 20/00 | (2019.01) |
| G06N 5/04 | (2006.01) |
| G06K 9/62 | (2022.01) |

(Continued)

(52) U.S. Cl.
CPC ............... G07D 7/202 (2017.05); G06N 5/04 (2013.01); G06N 20/00 (2019.01); G06T 7/001 (2013.01); G07D 11/50 (2019.01); G06K 9/6256 (2013.01); G06T 2207/20081 (2013.01); G06T 2207/30144 (2013.01); G06V 20/80 (2022.01); G06V 30/10 (2022.01); G07D 2207/00 (2013.01)

(58) Field of Classification Search
CPC ............... G07D 11/50; G07D 2207/00; G06K 9/00577; G06K 2209/01
See application file for complete search history.

(56) References Cited

U.S. PATENT DOCUMENTS

| | | | | |
|---|---|---|---|---|
| 4,128,158 A | * | 12/1978 | Dautremont, Jr. | G07D 5/08 |
| | | | | 194/317 |
| 4,811,040 A | * | 3/1989 | Madsen | G07D 5/10 |
| | | | | 356/600 |

(Continued)

FOREIGN PATENT DOCUMENTS

| | | |
|---|---|---|
| CN | 108062820 A | 5/2018 |
| JP | 2006004282 A | 1/2006 |

*Primary Examiner* — Solomon G Bezuayehu
(74) *Attorney, Agent, or Firm* — Dentons Durham Jones Pinegar

(57) ABSTRACT

Using software to process images and/or digital representations of paper currency to determine if currency has a value greater than the face value of the currency to any person or persons. Software that can determine from images and/or digital representations (known or unknown) numismatic value, or value greater than the face value of the currency to any person or persons and indicia of numismatic value, or increased value, including, but not limited to: ink smearing, misaligned serial numbers, misaligned seals on currency, non-matching serial numbers, off center printing, off-center cutting, paper currency of small or limited print runs, fancy serial numbers, missing or off-center watermarks, errors in security features, holograms, ultra-violet features, magnetic features, microprinting, etc. to determine a numismatic value.

9 Claims, 1 Drawing Sheet

```
Output is generated from currency-counting machine.
                        |
                        |
   Software analyzes the information and determines
   through the software if the currency has value greater
                    than its face value.
                        |
                        |
         The software then outputs a summary of which
         currency has collectable value to the user.
```

(51) Int. Cl.
*G06V 20/80* (2022.01)
*G06V 30/10* (2022.01)

(56) References Cited

U.S. PATENT DOCUMENTS

| | | | | |
|---|---|---|---|---|
| 4,842,428 A * | 6/1989 | Suzuki | ......... | G06F 40/232 |
| | | | | 400/74 |
| 4,899,392 A * | 2/1990 | Merton | ......... | G07D 5/00 |
| | | | | 356/600 |
| 5,745,911 A * | 4/1998 | Sugiyama | ......... | B41J 5/30 |
| | | | | 715/236 |
| 5,875,259 A | 2/1999 | Mennie et al. | | |
| 6,366,899 B1 * | 4/2002 | Kernz | ......... | G06Q 30/0623 |
| 8,391,583 B1 * | 3/2013 | Mennie | ......... | G06V 10/98 |
| | | | | 235/379 |
| 9,378,604 B1 * | 6/2016 | Rathjen | ......... | G07D 5/005 |
| 9,894,966 B2 * | 2/2018 | Meyer-Steffens | ....... | G07F 1/06 |
| 10,068,406 B1 * | 9/2018 | Jagielinski | ......... | G07D 11/22 |
| 11,176,651 B2 * | 11/2021 | Liberatori, Jr. | ......... | G06T 7/001 |
| 2002/0107783 A1 * | 8/2002 | La Mura | ......... | G06Q 40/04 |
| | | | | 705/37 |
| 2003/0081973 A1 * | 5/2003 | Laughlin | ......... | G06K 15/00 |
| | | | | 400/61 |
| 2005/0011093 A1 * | 1/2005 | Peterson | ......... | G09F 3/00 |
| | | | | 428/542.6 |
| 2005/0080645 A1 * | 4/2005 | Counts | ......... | G06Q 40/04 |
| | | | | 705/37 |
| 2007/0172106 A1 * | 7/2007 | Paraskevakos | ......... | G07D 11/0087 |
| | | | | 382/135 |
| 2008/0106726 A1 * | 5/2008 | Park | ......... | G07D 7/0043 |
| | | | | 194/302 |
| 2008/0149518 A1 * | 6/2008 | Macor | ......... | B65D 85/58 |
| | | | | 206/459.5 |
| 2009/0107800 A1 * | 4/2009 | Nishida | ......... | G07D 11/50 |
| | | | | 194/302 |
| 2009/0315253 A1 | 12/2009 | Osakabe et al. | | |
| 2010/0235270 A1 * | 9/2010 | Baker | ......... | G06Q 40/00 |
| | | | | 707/E17.108 |
| 2012/0140791 A1 | 6/2012 | Lawandy | | |
| 2012/0301009 A1 * | 11/2012 | Dabic | ......... | G07D 3/14 |
| | | | | 382/136 |
| 2013/0315437 A1 * | 11/2013 | Kerschner | ......... | G06V 10/751 |
| | | | | 705/317 |
| 2014/0098360 A1 | 4/2014 | Kwon | | |
| 2014/0236809 A1 * | 8/2014 | Pinault | ......... | G06Q 20/3255 |
| | | | | 705/39 |
| 2014/0248946 A1 * | 9/2014 | Searls | ......... | G07F 17/3293 |
| | | | | 463/30 |
| 2014/0337989 A1 * | 11/2014 | Orsini | ......... | H04L 51/212 |
| | | | | 726/26 |
| 2014/0355864 A1 * | 12/2014 | Truong | ......... | G06T 7/0004 |
| | | | | 382/136 |
| 2015/0031442 A1 * | 1/2015 | Colvin | ......... | G07F 17/3244 |
| | | | | 463/25 |
| 2015/0127430 A1 * | 5/2015 | Hammer, III | ......... | G06Q 30/0206 |
| | | | | 705/7.35 |
| 2015/0127507 A1 * | 5/2015 | Hall | ......... | G06Q 30/0627 |
| | | | | 705/37 |
| 2015/0178692 A1 * | 6/2015 | Nishida | ......... | G07D 11/50 |
| | | | | 705/45 |
| 2016/0148283 A1 * | 5/2016 | Bornstein | ......... | G06Q 30/0278 |
| | | | | 705/306 |
| 2016/0148284 A1 * | 5/2016 | Bornstein | ......... | G06Q 30/0278 |
| | | | | 705/306 |
| 2016/0187261 A1 * | 6/2016 | Hager | ......... | G01N 21/8803 |
| | | | | 356/237.2 |
| 2016/0210734 A1 * | 7/2016 | Kass | ......... | G06T 7/001 |
| 2018/0150956 A1 * | 5/2018 | Kao | ......... | G06V 10/454 |
| 2019/0114762 A1 * | 4/2019 | Liberatori, Jr. | ......... | G06T 7/55 |
| 2019/0138836 A1 * | 5/2019 | Macor | ......... | G06Q 30/018 |
| 2019/0228606 A1 | 7/2019 | Nishimura | | |
| 2019/0337322 A1 * | 11/2019 | Tanko | ......... | B42D 25/22 |
| 2020/0105099 A1 * | 4/2020 | Colvin | ......... | G07F 17/3255 |
| 2020/0293623 A1 * | 9/2020 | Saito | ......... | G06N 3/0445 |
| 2020/0294357 A1 * | 9/2020 | Kotab | ......... | G07F 17/3202 |
| 2020/0342428 A1 | 10/2020 | Benkreira et al. | | |
| 2020/0342704 A1 * | 10/2020 | Pechinko | ......... | G06V 10/143 |

\* cited by examiner

METHOD AND SYSTEM FOR DETERMINING IF PAPER CURRENCY HAS NUMISMATIC VALUE

TECHNICAL FIELD

This disclosure relates to the field of numismatic paper currency searching, processing, and more particularly to the field of numismatics, notaphily, and rare or collectible paper currency.

BACKGROUND

In the world of paper currency collecting, searching paper currency for errors, varieties, rare and personally desirable paper currency has been done by hand, by an individual, and has always been a time-consuming process. Additionally, indicia of numismatic value may be overlooked as an notaphilist analyzes paper currency.

SUMMARY

We have developed software that can significantly reduce the time required to process paper currency and processing images and/or digital representations of paper currency allowing the software to determine if the paper currency can be considered collectible, or has numismatic or notaphilic value (i.e., value greater than its face value). The methods and systems of this disclosure may be used to determine whether paper currencies from anywhere throughout the world may have numismatic value, or a value that exceeds their face value.

DETAILED DESCRIPTION

Figure 1:
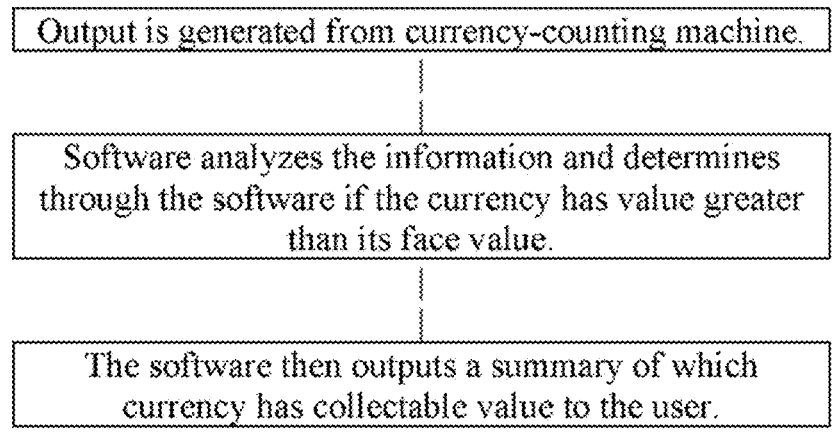
FIG. 1 is a flow chart of a first embodiment of the disclosed method.
Figure 2:
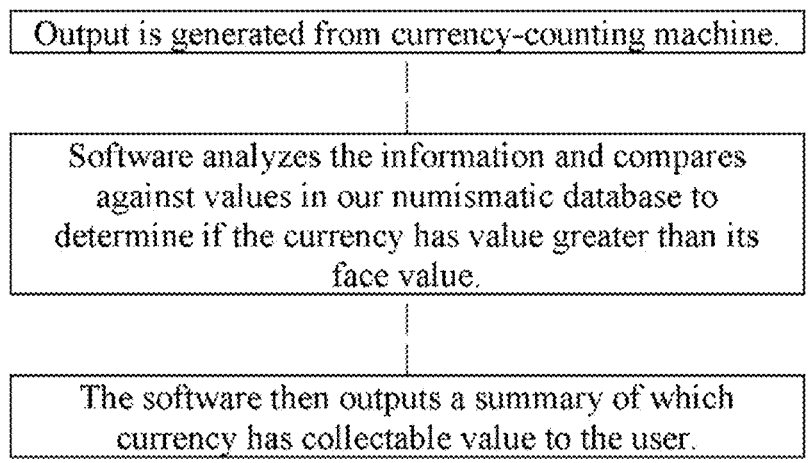
FIG. 2 is a flow chart of a second embodiment of the disclosed method.

We can use an existing cash counting machine that can output digital images and OCR results of the serial numbers for paper currency, which includes, but is not limited to, currency comprised of paper, cloth, linen, polymers and other materials. We can also use a currency-counting machine that can output more of the currency's text in OCR (e.g., date, denomination, series, both serial numbers, mint, etc.). Currency-counting machines that obtain images or digital representations of various features of paper currency, including, but not limited to, watermarks, microprinting, holograms, ultra-violet features, and magnetic features, can also be used.

The software analyzes the output of a currency-counting machine to determine whether text on the paper currency (e.g., certain serial numbers, mismatched serial numbers, mint date, mint, misspellings, etc.) may impart the paper currency with numismatic value. The software may recognize and analyze images of various features on paper currency (e.g., misalignments, ink smears, etc.) to determine whether or not the paper currency may have numismatic value. The software may also grade the paper currency in accordance with a numismatic standard. The software may also analyze output of the machine to determine if any security features, ultraviolet features, or magnetic features have any numismatic or notaphilic value.

The software may be executed by one or more processing elements of a processing device evaluating paper currency. Such a processing device may include a computer, a smart phone, or the like. Alternatively, cloud computing may be used to use the software to determine the potential numismatic value of paper currency (e.g., through a web browser on a computer, through an application on a smart phone or a tablet computer, etc.).

An embodiment of a process for determining whether or not paper currency has numismatic value may include:
1) Loading money into the currency-counting machine.
2) Allowing the currency-counting machine to process the currency and output a file; for example, the currency-counting machine may output a file including one or more of the serial numbers, mint dates, mints, denominations, etc., of the bills processed.
3) The text file is read by our software which analyzes the information and determines through the software or compares against values in our numismatic database to determine if the currency potentially has value greater than its face value.
4) The software then outputs a summary of which currency may have collectable value to the user.

Utilizing standardized computer coding processes, after receiving images and/or digital representations and/or optical character recognition output and imported into our software, our software then analyzes the images and/or digital representations and/or optical character recognition output for numismatic value associated with the paper currency.

The invention claimed is:

1. A method for evaluating digital representations or images of paper currency to determine if the paper currency has an actual value greater than a face value of the paper currency comprising:
   introducing the paper currency into a currency counting machine;
   identifying and recognizing text on the paper currency as the paper currency is counted by the currency counting machine;
   using artificial intelligence to evaluate the text to determine whether the text includes an error or imparts a serial number with a characteristic that imparts the paper currency with an actual value that exceeds a face value of the paper currency; and
   if the actual value exceeds the face value, generating an alert of a potential collectability of the paper currency.

2. The method of claim 1, further comprising:
   using the artificial intelligence to determine the actual value of the paper currency.

3. The method of claim 1, wherein identifying and recognizing the text comprises optical character recognition.

4. The method of claim 1, wherein using the artificial intelligence comprises using machine learning.

5. A method for evaluating paper currency digital representations or images of paper currency to determine if the paper currency has an actual value greater than a face value of the paper currency comprising:
   introducing the paper currency into a currency counting machine;
   identifying and recognizing text on the paper currency as the paper currency is counted by the currency counting machine;
   determining whether a misspelling in the text or a characteristic of a serial number imparts the paper currency with an actual value that exceeds the face value with artificial intelligence; and if the actual value exceeds the face value, generating an alert of a collectability of the paper currency.

6. The method of claim 5, wherein identifying and recognizing text comprises identifying and recognizing at least one of a denomination of the paper currency, a series of the paper currency, a mint that produced the paper currency, a date of the paper currency, and a serial number of the paper currency.

7. A method for evaluating paper currency digital representations or images of paper currency to determine if the paper currency has an actual value greater than a face value of the paper currency comprising:

introducing the paper currency into a currency counting machine;

identifying and recognizing at least one serial number on the paper currency as the paper currency is counted by the currency counting machine;

determining whether a characteristic of the at least one serial number imparts the paper currency with an actual value that exceeds the face value with artificial intelligence; and if the actual value exceeds the face value, generating an alert of a collectability of the paper currency.

8. The method of claim 7, wherein identifying and recognizing at least one serial number on the paper currency comprises identifying and recognizing a plurality of serial numbers on the paper currency.

9. The method of claim 8, wherein determining whether the characteristic of the at least one serial number imparts the paper currency with an actual value that exceeds the face value comprises comparing the plurality of serial numbers to each other to determine whether the plurality of serial numbers match and, if the plurality of serial numbers do not match, concluding that the actual value exceeds the face value.

* * * * *